United States Patent
Maurer

(10) Patent No.: US 6,906,743 B1
(45) Date of Patent: Jun. 14, 2005

(54) DETECTING CONTENT BASED DEFECTS IN A VIDEO STREAM

(75) Inventor: Steven D. Maurer, Aloha, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/231,128

(22) Filed: Jan. 13, 1999

(51) Int. Cl.⁷ ............................................. H04N 17/00
(52) U.S. Cl. ...................... 348/180; 348/700; 348/184; 348/192
(58) Field of Search ................................ 348/700, 701, 348/192, 193, 180, 184, 722; 725/22, 107, 108

(56) References Cited

U.S. PATENT DOCUMENTS

| | | | | |
|---|---|---|---|---|
| 4,430,671 A | * | 2/1984 | Tamer ..................... | 358/192.1 |
| 5,621,454 A | * | 4/1997 | Ellis et al. ..................... | 348/2 |
| 5,757,435 A | | 5/1998 | Wells | |
| 6,041,142 A | * | 3/2000 | Rao et al. .................... | 382/232 |
| 6,075,552 A | * | 6/2000 | Hasegawa .................... | 348/12 |
| 6,100,941 A | * | 8/2000 | Dimitrova et al. .......... | 348/700 |
| 6,175,386 B1 | * | 1/2001 | Van De Schaar-Mitrea et al. ........................... | 348/563 |

FOREIGN PATENT DOCUMENTS

| | | | |
|---|---|---|---|
| EP | 0 838 960 | 4/1998 | |
| JP | 06 268975 | 9/1994 | |
| JP | 9-266567 | * 10/1997 | .......... H04N/7/025 |

OTHER PUBLICATIONS

Wu, Chao–Hui; Koh, Liang; Liu, Ming T. "a Synchronization and Compensation Protocal for Multimedia Communication Systems", Network Protocals, 1995. Proceedings., 1995 International Conference at Tokyo, Japan, Nov. 7, 1995, Los Alamitos, CA, US, IEEE Comput. Soc, US.

* cited by examiner

Primary Examiner—Victor R. Kostak
(74) Attorney, Agent, or Firm—Francis I. Gray

(57) ABSTRACT

A method of detecting content based defects in previously compressed video streams decodes a video channel from the compressed video streams and performs a match on a frame/field basis between each frame/field of the video channel and a black frame/field and/or a previous frame/field to detect missing frames/fields and/or duplicate frames/fields. The number of consecutive missing and/or duplicate frames/fields are counted and an alarm signal is generated when the count exceeds a specified value. A beat pattern detector may be used to differentiate between 3/2 pulldown and other duplicate frame/field content errors, and a graphics detector may be used to differentiate between lettering/graphics stills and other duplicate frame/field content errors.

17 Claims, 1 Drawing Sheet

DETECTING CONTENT BASED DEFECTS IN A VIDEO STREAM

BACKGROUND OF THE INVENTION

The present invention relates to processing of compressed video streams, and more particularly to a method of detecting content based defects in a video stream.

Companies which distribute video over compressed pathways, such as satellite or digital cable distributors, have hundreds of channels that need to be monitored for defects. Many choose to use equipment using single ended measurement algorithms, such as that described in co-pending U.S. patent application Ser. No. 09/152,495, filed Sep. 10, 1998 by Bozidar Jenko and Steven Maurer entitled "Picture Quality Measurement Using Blockiness", for real-time monitoring. However, as these algorithms only measure compression defects, they do not raise alarms based upon the content of the video stream itself. Therefore operators still need to continuously visually examine the channels for content based defects. Such content based defects may include, for example, excessive black or duplicate frames.

Besides blockiness, one of the major forms of defects in large channel distribution streams is "channel starvation." This typically occurs when an error by an encoder, or the baseband transport from the encoder to the decoder, damages a video stream beyond the decoder's ability to understand it. In this case the decoder has no choice but to repeat a previous frame. Detecting these kinds of errors is a high priority for satellite and digital cable distributors. Unfortunately it is difficult to distinguish channel starvation in a stream from intentional repeat images, such as banners and still frames or freezes. False positives also may occur when detecting SMPTE-A 3:2 pulldown or SMPTE-B 3:2 pulldown from movies at 24 frames per second to NTSC video at 30 frames per second.

What is desired is a robust method of detecting content based defects in a video stream.

BRIEF SUMMARY OF THE INVENTION

Accordingly the present invention provides a method of detecting content based defects in a video stream by detecting black or duplicate frames that almost never occur intentionally. A video stream is captured and compared each field with a black field and also with the corresponding field in the previous frame. Matching may be performed either as a direct comparison or via Power Signal to Noise Ratio (PSNR) against an operator adjustable comparison threshold. The sequence of matching and non-matching fields is then used as an input to a decision module that determines whether the pattern is consistent with normal video input or is more likely the result of an error in the video stream. A Loss of Service (LOS) warning may be generated when fields are continuously black for longer than an operator adjustable timeout value, i.e., each field that matches a black field increments a counter that is compared with an error threshold. A Freeze Frame warning may be generated when the fields match their predecessor fields for longer than a different operator adjustable timeout value. A Duplicate Field warning may be generated if a short sequence of matching fields occur in a sequence of otherwise different fields, but only if the operator has made a setting that no pulldown sequences are expected. If the operator setting indicates that 3:2 or 2:3 pulldown patterns are to be expected in the video stream, then the alarm decision process includes a beat pattern generator. Under this condition single matching fields that occur at a regular beat pattern interval do not cause a Duplicate Field warning. Changes in the beat pattern also may be detected and accounted for. For finer alarm control lettering/graphics, embedded audio and/or closed captioning detectors may be used to identify other content conditions and/or allow the operator to condition the severity of the warnings generated on multiple errors.

The objects, advantages and other novel features of the present invention are apparent from the following detailed description when read in light of the appended claims and attached drawing.

DETAILED DESCRIPTION OF THE INVENTION

Figure 1:
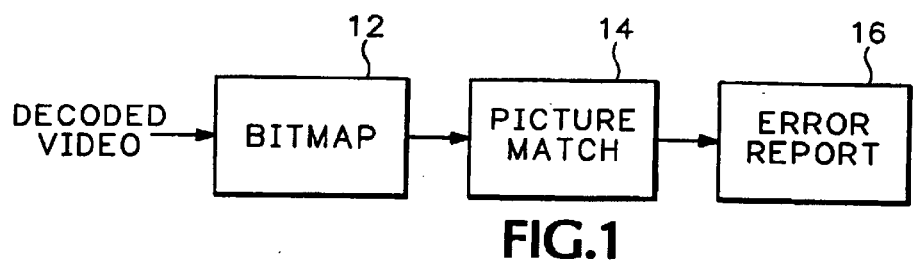
FIG. 1 is a block diagram view of a method of detecting content based defects in a video stream according to the present invention.

The purpose of this invention is to provide a simple video content alarm intended to bring quickly to an operator's attention a potential error in one of hundreds of video streams. Referring to FIG. 1 a decoded video stream input is captured as a bitmap 12. Each field from the bitmap 12 is compared in a picture match module 14 with a black field or a corresponding field from a previous frame. The output from the picture match module 14 is input to an error reporting module 16 that includes timers to give a separate alarm when either the black or duplicate field remains for over a user-specified period of time, usually several seconds. The alarm for continuous black fields is termed Loss of Service (LOS), and the alarm for extended duplicate fields is termed Freeze Frame.

Figure 2:
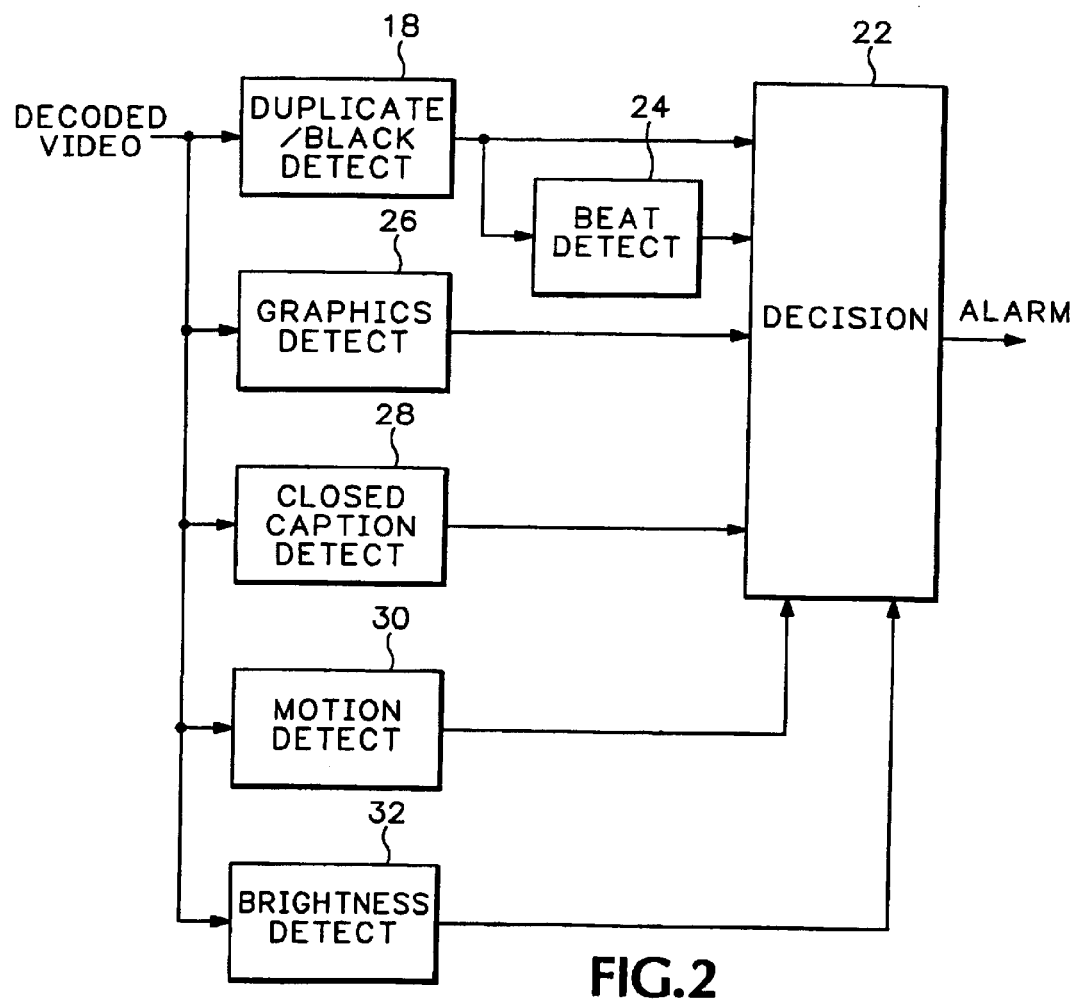
FIG. 2 is a more detailed block diagram view of the method of detecting content based defects in a video stream according to the present invention.

Alternatively the user may select to have the error reporting module 16 raise an alarm when a small group of identical fields is detected in a sequence of otherwise different fields. This detects Duplicate Fields in the video stream, and is shown in FIG. 2 where the picture match module 14 is a duplicate field detector 18. The output from the duplicate field detector 18 is input to a decision module 22 which generates the alarm signal. The decision module 22 includes appropriate counters so that the number of duplicate fields may be counted. When the count exceeds a specified value, an alarm condition is output to the error reporting module 16 which in turn reports the content defect in the video stream. The maximum number of Duplicate Frames to cause this alarm may be operator selectable, but may not be less than one duplicate.

Optionally in parallel the duplicate frame detector 18 feeds a field beat pattern detector 24 which detects content based field duplication, typically due to SMPTE-B 3:2 pulldown from movies. The beat pattern detector 24 may be a state machine that keeps track of skipped fields and has three states—Pulldown Detected, Pulldown Not Present and Unknown. When a non-black duplicate field is detected, the state machine latches into the Unknown state. Any immediately following Duplicate Field sets the state machine to be Pulldown Not Present. If exactly three frames later on the opposite field, i.e., five fields later, a second single Duplicate Field is detected, the state machine is set to the Pulldown Detected state. The Pulldown Detected state remains only as long as the Duplicate Fields continue every fifth field, no other Duplicate Fields are detected and the fields are not black. At the operator's option the machine state and the exact phase of the beat pattern, if any, may be input to the decision module 22 so that duplication of single fields due to 3:2 or 2:3 pulldown is either not reported as a Duplicate Field error, or it reduces the severity of the reported error. Duplicate Field errors that accompany change in the beat pattern are treated like a separate error—Bad Edit. These indicate likely incorrect video edits of movies in violation of SMPTE standards. At the operator's selection the presence of pulldown in video and/or changes in pulldown beat pattern may be separately reported as status information. If the operator selects options that result in the beat pattern detection input being non-applicable to the decision process, then the beat pattern detection portion may be entirely disabled.

Again optionally in parallel the field video data is input to a graphics detector 26 that detects lettering and/or computer generated graphics in the video stream—content that is most likely to be intentionally static on a display screen. The graphics detector 26 examines the video fields looking for groups of adjacent pixels with a minimum brightness (luminance value) that are identical. If it finds these, it may report this as a graphic. It may also perform an edge search detect and compare the resulting outline to various typical patterns—straight horizontal and vertical lines being the most common. Other more sophisticated graphics detection may also be incorporated. At the operator's option Graphics/Lettering is input to the decision module 22 from the graphics detector 26 to indicate that extended duplication of fields is not cause for an Freeze Frame alarm. Alternatively a separate counter may be set by the operator to indicate an extra length of time a field containing graphics may remain before an alarm is given. A counter also records the operator's preference for a minimum number of fields a Duplicate Field containing graphics must remain on the display for the graphic to be considered intentional, i.e., four Duplicate Fields are a content error regardless of whether it contains graphics because no one can read that fast.

Optionally in parallel a closed caption module 28 may examine an ancillary portion of the video stream looking for closed caption data. This module reports whether it finds closed caption data and, if it does, whether the closed caption data is changing. This information is fed to the decision module 22. Presence of closed caption data that is unchanging may be separately reported as an error at the operator's option, or used to further condition the Freeze Frame and/or LOS errors. Operator adjustable timeout counters in the decision module 22 may also be used to specify a maximum and minimum length of time closed caption data may occur before a Stuck Closed Caption or Unviewable Closed Caption warning is output. The closed caption module 28 may be disabled entirely at the operator's discretion.

Another option is a motion detection module 30 that compares each field to its previous corresponding field to determine motion present in each block of the picture. This may be performed by any one of a number of motion estimation algorithms, such as the Mean Absolute Difference (MAD) algorithm, which are well known in the art. The results output from the motion detection module 30 are input to the decision module 22. These results are used to detect Skipped Field errors by looking for overall motion, such as panning, in the same direction as, but disproportionate to, both previous and subsequent corresponding field motion. For example, if a local video sequence contains a field-wide shift of two pixels to the left, then has a field-wide shift of four pixels to the left, and then continues with additional field-wide shifts of two pixels to the left, this is a strong indication that a field was skipped during the four pixel shift because overall motion is nearly always smooth. When monitoring 3:2 and 2:3 pulldown sequences, the decision module 22 modifies its expectation of what motion is to be expected.

Motion detection also may be used to condition Duplicate Field and Skipped Field alarms. For example, the operator may set a threshold below which Skipped Field alarms are reported at a lower priority or not reported because skipped fields are difficult for viewers to perceive when movement is largely absent in the video sequence anyway. Finally a similar method of detecting Skipped Fields may be employed when the motion detector module 30 detects identical but opposite motion around the edges of fields in a video sequence and not motion in the center—zoom in or zoom out. Abrupt discontinuities in zoom motion compared to both previous and subsequent zoom frames may be set at the operator's option to trigger the Skipped Field alarm. Again the motion detector module 30 may be entirely disabled at the operator's discretion.

Yet another option is a simple Average Picture Level (APL) or brightness module 32 that calculates a maximum and overall brightness of the fields in the video sequence. The results from the APL module 32 are input to the decision module 22. The APL results are used to differentiate between LOS and Freeze Frame errors. They may also be used by the operator to condition the alarms or the severity of the alarms based on overall picture level. For example, the operator may not wish to be informed of short sequences of Duplicate Fields that are very dim, which occur during fade to black—steadily decreasing APL to zero brightness, or which occur during fade in—steadily increasing APL from zero brightness. This option may be implemented via an operator adjustable minimum APL threshold for each type of alarm, and separate adjustable time thresholds to present alarms during change from or to a minimum APL.

The decision module 22 raises alarms based upon operator settings. These include any combination or permutation of the outputs from the above-discussed detectors. Default settings include, but are not limited to, LOS, Freeze Frame w/o Graphics, Extended Freeze Frame w/Graphics, Duplicate Fields or Frames, Unexpected Pulldown—3:2 or 2:3 pulldown detected on video sequences where the operator states no pulldown exists, Bad Edit—DF during beat pattern change, SF and Unviewable Graphic—Duplicate Fields with graphics too short for viewers to see. The operator may designate degrees of severity for these errors or condition the severity on any combination or permutation of the inputs desired. By default the decision module 22 reports a severe error—immediate operator intervention suggested—for LOS and both types of Freeze Frame. Normal errors are returned for all Missing and Duplicate Field/Frame errors, Stuck Closed Caption and Unviewable Closed Caption errors. By default warnings are provided for Unexpected Pulldown and Bad Edit. Presence of other features may be reported at the operator's discretion, but by default are of an information status only. The operator may change any number of these or require different combinations for status reporting, and control the severity of the errors reported depending upon the combinations selected.

Thus the present invention provides for detecting content based defects in a video stream by testing the field data and changes in field data to generate an appropriate alarm signal to an operator.

What is claimed is:

1. An apparatus for detecting content based defects in a video stream comprising:

a plurality of detectors, each having an input coupled in parallel to receive the video stream and having an output, the output from each detector providing a separate specified content characteristic of the video stream;

means for determining whether one of the separate specified content characteristics meet a predetermined alarm criterion; and means for reporting an error when the predetermined alarm criterion is met.

2. The apparatus as recited in claim 1 wherein the detectors include a duplicate field detector, a black field detector, a graphics detector, a closed caption detector, a motion detector and a brightness detector each having an input coupled to receive the video stream and an output coupled to provide the separate specified content characteristic to the determining means.

3. The apparatus as recited in claim 2 further comprising a beat pattern detector having an input coupled to the output of the duplicate field detector and having an output coupled to provide a pulldown indicator signal as the separate specified content characteristic to the determining means.

4. The apparatus as recited in claim 2 wherein the duplicate field detector comprises a picture match module for matching each field of the video stream with a black field to provide an output for each match that occurs indicative of a missing field in the video stream as the separate specified content characteristic.

5. The apparatus as recited in claim 2 wherein the duplicate field detector comprises a picture match module for matching each field of the video stream with a corresponding field from a previous frame of the video stream to provide an output for each match that occurs indicative of a duplicate field in the video stream as the separate specified content characteristic.

6. The apparatus as recited in claim 5 wherein the detectors further include a beat pattern detector having an input coupled to the output of the picture match module and having an output coupled to the determining means, the beat pattern detector providing a pulldown indication signal as the separate specified content characteristic.

7. The apparatus as recited in claim 2 wherein the graphics detector provides a graphics signal indicative of when duplicate fields result from graphic fields in the video stream as the separate specified content characteristic.

8. The apparatus as recited in claims 4 or 5 wherein the determining means comprises:

a counter for counting each output from the picture match module to provide a count output; and means for indicating the error when the count output reaches a designated number as the specified alarm criterion.

9. The apparatus as recited in claim 6 wherein the determining means comprises:

a counter for counting each output from the picture match module to provide a count output; and means for indicating the error when the count output reaches a designated number that is not related to pulldown.

10. The apparatus as recited in claim 7 wherein the determining means comprises:

a counter for counting each output from the graphics detector to provide a count output; and means for indicating the error when the count output reaches a designated number that is not related to lettering/graphic video.

11. The apparatus as recited in claim 2 wherein the closed caption detector provides an indication of the status of closed caption as the separate specified content characteristic.

12. The apparatus as recited in claim 2 wherein the motion detector provides an indication of missing fields as the separate specified content characteristic.

13. The apparatus as recited in claim 2 wherein the brightness detector provides a level signal as the separate specified content characteristic.

14. The apparatus as recited in claims 1 or 2 wherein the determining means comprises logic having as inputs the outputs from the detectors to provide the error with a given priority.

15. A method of detecting content based defects in a video stream comprising:

detecting a specified content characteristic in the video stream using a plurality of detectors, each having an input coupled in parallel to receive the video stream and having an output coupled to the determining means, the output from each detector providing a separate specified content characteristic as the specified content characteristic;

determining whether the specified content characteristic meets a predetermined alarm criterion; and reporting an error when the predetermined alarm criterion is met.

16. The method as recited in claim 15 wherein the detectors are selected from the group consisting of a duplicate field detector, a black field detector, a graphics detector, a closed caption detector, a motion detector, and a brightness detector, each detector having an input coupled to receive the video stream and an output for providing an output signal representative of the separate specified content characteristic, the output signal being input to the determining step.

17. The method as recited in claim 16 wherein the detecting step further comprises the step of detecting a beat pattern to provide a pulldown indication output signal when the output signal from the duplicate field detector indicates a duplicate field at specified regular intervals, the output being coupled to provide the pulldown indication signal to the determining step as the separate specified content characteristic.

* * * * *